Figure 1:
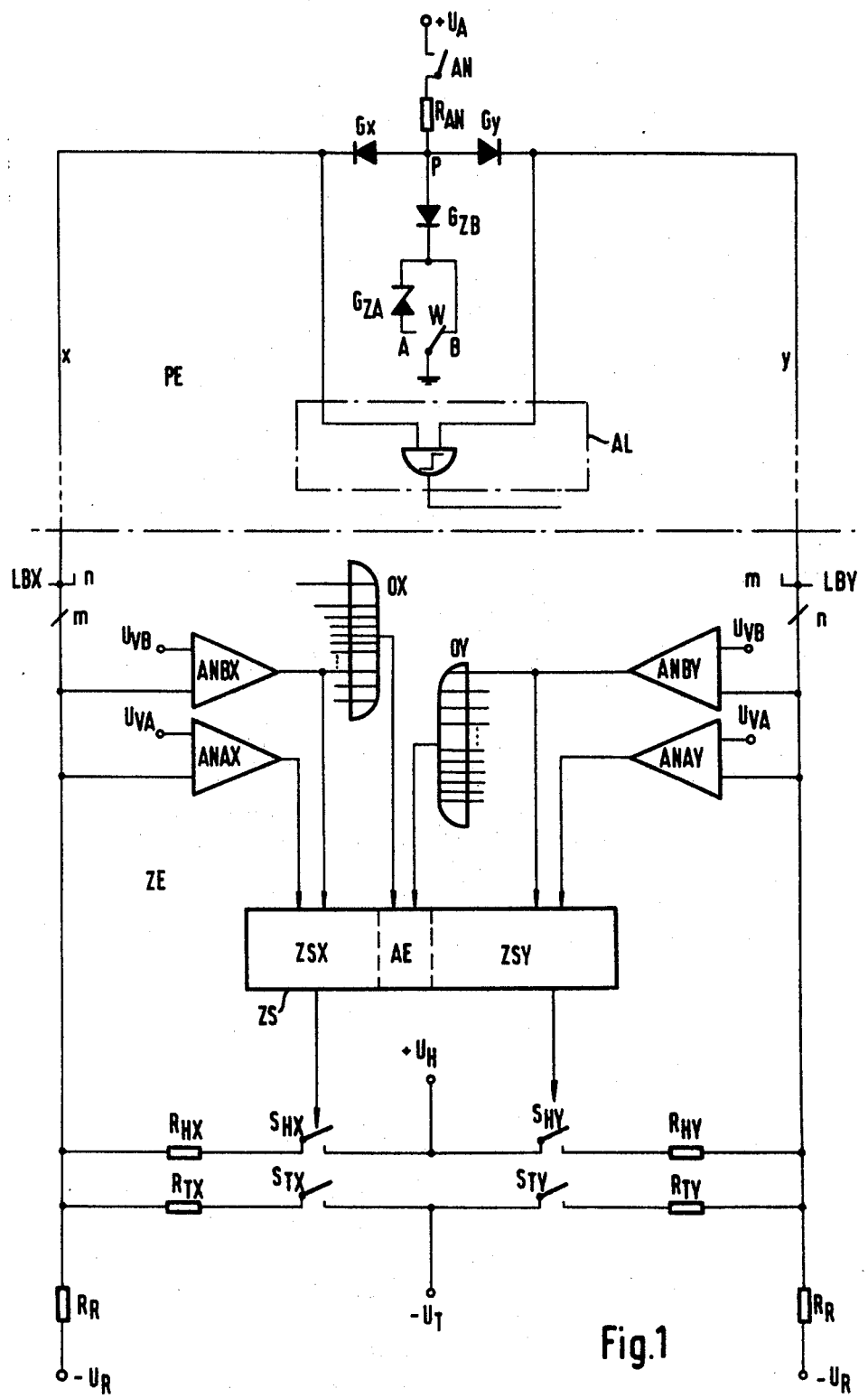

United States Patent [19]

Heine et al.

[11] 4,110,555
[45] Aug. 29, 1978

[54] CIRCUIT ARRANGEMENT FOR IDENTIFICATION AND ADDRESSING

[75] Inventors: Bernhard Heine, Leonberg; Wolfgang Arndt, Ludwigsburg; Hartmut Löwer, Weissach, all of Germany

[73] Assignee: International Standard Electric Corporation, New York, N.Y.

[21] Appl. No.: 791,654

[22] Filed: Apr. 28, 1977

[30] Foreign Application Priority Data

May 4, 1976 [DE] Fed. Rep. of Germany ....... 2619608

[51] Int. Cl.² ............................................. H04Q 3/42
[52] U.S. Cl. ................................. 178/3; 179/18 GF; 340/166 R
[58] Field of Search ............... 178/2 R, 2 C, 2 D, 2 E, 178/3; 340/166 R, 147 R, 147 LP; 179/18 G, 18 GF

[56] References Cited

U.S. PATENT DOCUMENTS 3,993,979  11/1976  Mehlich ........................... 340/166 R
4,041,458  8/1977   Gravdahl ......................... 340/166 R Primary Examiner—Thomas A. Robinson
Attorney, Agent, or Firm—James B. Raden; Marvin M. Chaban

[57] ABSTRACT

To connect one out of a plurality of peripheral units to a data bus, each unit is connected to two wires of an address matrix. When a unit wants to connect itself to the data bus, it applies a starting voltage to both wires. The central unit then searches in both matrix coordinates for the two wires of the starting-voltage-transmitting unit and connects the unit so found to the data bus by excitation via the wires.

6 Claims, 2 Drawing Figures

CIRCUIT ARRANGEMENT FOR IDENTIFICATION AND ADDRESSING

The present invention relates to a circuit arrangement for identifying and addressing peripheral units from a central unit via lines formed into groups on a coordinate basis wherein a peripheral unit desiring to transmit data to the central unit first transmits over lines of the coordinates a start signal which may have a changed potential to identify data having priority and which causes the start-signal-transmitting peripheral unit to be identified in the central unit by initiating a search in the lines of the coordinates, and wherein, for an exchange of data via a data bus, a peripheral unit is addressed by being selected on a coordinate basis, particularly for telecommunication switching systems.

A circuit arrangement of this kind is known from German Offenlegungsschrift (DT-OS) 2,105,525.

For an exchange of data between a central unit and one out of a plurality of peripheral units on the so-called one-at-a-time principle, a data bus is provided to which a desired peripheral unit is connected from the central unit.

To connect a desired peripheral unit, there is provided a coordinate network which extends through the peripheral units organized in the manner of a matrix, with each peripheral unit connected to a line of the first coordinate and to a line of the second coordinate. All lines of a coordinate are combined in a group. The connection of the desired peripheral unit is effected by simultaneous excitation of these two lines and is called "addressing".

If a peripheral unit wants to transmit data to the central unit, it must first send a start signal. This start signal, too, is transmitted over two lines associated with different groups of coordinates. After reception of the start signal, a search in the lines is initiated in order to determine the address of the start-signal-transmitting peripheral unit. This process is referred to as "identification". The address then serves to connect the start-signal-transmitting peripheral unit to the data bus, as described above.

In the known circuit arrangement, one group of lines is saved by using the lines of the first coordinate for both identification and addressing.

If data having priority over other data must be transmitted from a peripheral unit to the central unit, the start signal must have a priority indicator which is recognized by the central unit.

In the known circuit arrangement, a start signal with a priority indicator is transmitted over a separate coordinate group. As an alternative it is mentioned that the priority indicator can be transmitted over the same lines as the normal start signal, but with a different voltage. The elements necessary therefor are neither shown nor explained in the pertinent embodiment of the known circuit arrangement.

The object of the invention is to further reduce the number of lines required.

The invention is characterized in that the same lines are used for both identification and addressing, that each line belongs to a different group, that in each peripheral unit a voltage source is simultaneously connectable to each of the lines for start-signal transmission, that each peripheral unit contains a connecting logic which is connected to the lines, has a blocking voltage applied thereto in the quiescent condition, and causes connection of the peripheral unit to be addressed to the data bus only if a minimum voltage with a polarity opposite to that of the blocking voltage is applied to the lines. This has the additional advantage that, because of the redundant start-signal transmission, there are possibilities of supervision, and that the start-signal recognition in the central unit is made particularly safe.

Figure 2:
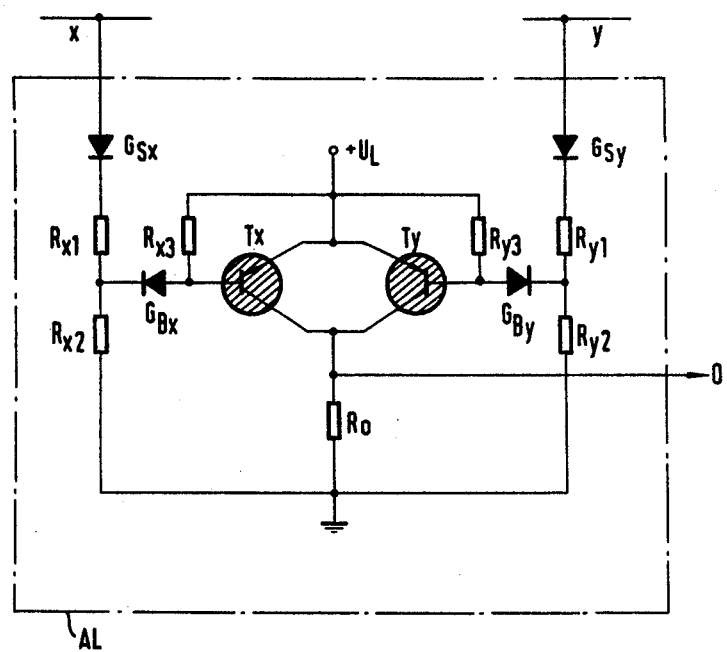

The invention will now be explained in more detail with reference to the accompanying drawings, showing, by way of example, a preferred embodiment of the invention, and in which:

FIG. 1 is a block diagram of the circuit arrangement with a central and a peripheral unit, and FIG. 2 is a circuit diagram of the connecting logic contained in FIG. 1.

The central unit ZE below the dash-and-dot line is connected to a plurality of peripheral units via two groups of lines LBX and LBY; for simplicity, only one peripheral unit PE with its associated lines $x$ and $y$ is shown above the dash-and-dot line. The line $x$ is one out of $m$ lines in the group LBX of the X-coordinate, and the line $y$ is one out of $n$ lines in the group LBY of the Y-coordinate. The peripheral units are organized in the form of a matrix, as described by way of introduction, so the line $x$, for example, is connected to $n$ peripheral units, and the line $y$ to $m$ peripheral units, with only the peripheral unit PE connected to both the line $x$ and the line $y$.

In the following it is described with the aid of the figure how the peripheral unit PE starts the central unit.

A distinction must be made between normal start signals and start signals having priority. The latter are transmitted only if data, e.g. error messages from faulty functional units, have to be passed on immediately.

In the quiescent condition, a blocking voltage $-U_R$ is applied from a voltage source to each of the lines $x$ and $y$ via a high-value resistor $R_R$. All lines are always connected to the common voltage source ($-U_R$) via the resistor $R_R$ individually associated with them.

For the transmission of a start signal, the start contact AN in the peripheral unit PE closes, so a voltage source $+U_A$ is connected to a medium-value resistor $R_{AN}$, and a current flows from the voltage source $+U_A$ through the resistor $R_{AN}$ and the diodes Gx and Gy into the lines $x$ and $y$, whereby the charge on the latter is reversed. As soon as the voltage at the junction point P of the resistor $R_{AN}$ and the two diodes Gx and Gy has become positive, another diode $G_{ZB}$ connected to this junction point P is caused to conduct and limits the voltage at the junction point P according to the set operating point.

The diode $G_{ZB}$ is connected to ground via a switch W in the position B, whereby the normal start signal is transmitted. The start signal with priority indicator is transmitted in the position A of the switch; in this case, the voltage at the junction point and also in the line is higher by a value dropping across a zener diode $G_{ZA}$. It should be mentioned that the switch W may have a third position in which a second zener diode generates a third priority characteristic. For the sake of clarity, however, this is not shown in the figure. It should also be mentioned that only one type of start signal is commonly used for a peripheral unit, and that switchover takes place in special cases only.

In the central unit ZE, the line $x$ is connected to individual start-signal recognition devices ANAX and ANBX, and the line $y$ to start-signal recognition devices ANAY and ANBY. Each of the start-signal recognition devices ANAX, ANBX, ANAY and ANBY has an additional input to which a threshold voltage $U_{VB}$, $U_{VA}$ is applied, so their outputs will provide a signal when a voltage exceeding the threshold voltage appears on the line $x$ or $y$. While the start-signal recognition devices ANBX and ANBY recognize normal start signals and start signals having priority, the start-signal recognition devices ANAX and ANAY, because of their higher threshold voltage $U_{VA}$, respond only to start signals having priority. The outputs of the start-signal recognition devices connected to the $m$ lines in the group LBX, e.g. of the recognition device ANBX, are connected both individually to the left portion ZSX of a central control ZS and in common, via an OR element OX, to a start-signal input device AE, while the $n$ lines in the group LBY are connected individually to the right portion ZSY of the central control ZS and in common, via an OR element OY, to the start-signal input device AE of the central control ZS. The start-signal recognition devices ANAX and ANAY are connected, respectively, to the left portion ZSX and the right portion ZSY of the central control ZS; ORing is not necessary here because the start signals having priority also excite the start-signal recognition devices ANBX and ANBY. Because of the ORing of the start signals, the central control ZS knows immediately that a start signal is present, whereupon the individual lines are searched successively for the purpose of identifying the start-signal-transmitting peripheral unit, it being ensured that start signals having priority are identified first.

It should be mentioned that the search will also be initiated if the start signal has been received by only one line, e.g. the line $y$. The redundancy caused by the start-signal transmission on both lines increases the safety of the start-signal recognition and is used for supervision purposes.

The search begins in the lines of the group LBX. When the line $x$ has been found — whereby half the address of the peripheral unit is known — the left portion ZSX of the central control ZS closes all switches STX, whereby all lines of the group LBX are connected to a common voltage source $-U_T$ via individual low-value resistors $R_{TX}$ and are thus brought quickly to the low potential $-U_T$ of this voltage source.

As a result, in all peripheral units PE, the voltage at the junction point P drops to a negative value, so if the start contact AN is closed, approximately the sum of the voltages $U_A + U_T$ will drop across the resistor $R_{AN}$; thus, the start signal is suppressed. The absence of current flowing through the diode Gy into the line $y$ now causes the line $y$ to return to the previously described quiescent condition, i.e., the blocking voltage $-U_R$ is applied to it.

This condition which exists on all lines, is used to check all start-signal recognition devices as to whether one of them is erroneously transmitting a start signal to the central control ZS.

While the start-signal suppression on all lines of the group LBX is maintained for the duration of the current identification and of the subsequent addressing to ensure that only those peripheral units are interrogated which are connected to the line $x$, the switch $S_{TX}$ of the already identified line $x$ is reopened after a short time, so the start signal becomes effective again on both lines $x$ and $y$ connected to the start-signal-transmitting peripheral unit PE.

This is followed by a search in the lines of the group LBY which is performed in the same manner as the above-described search in the lines of the group LBX, until the line $y$ and, thus, the complete address of the peripheral unit PE are known. Then all other lines in the group LBY are connected to the common voltage source $-U_T$ via the closing contacts $S_{TY}$ and the low-value resistors $R_{Ty}$.

The addressing of the peripheral unit PE for connection to the data bus (not shown) is done from the central control ZS by controlling two contacts $S_{HX}$ and $S_{HY}$ which, after having closed, connect the lines $x$ and $y$ to the common voltage source $+U_H$ via low-value resistors $R_{HX}$ and $R_{HY}$, respectively, whereby these lines are positively charged. At the same time, the contacts $S_{TX}$ and $S_{TY}$ for all other lines of the groups LBX and LBY are closed unless this was already done during identification.

As a result, the diodes Gx and Gy connected to the two lines $x$ and $y$ are reverse-biased, so the elements connected to the junction point P are isolated from the lines $x$ and $y$.

Also connected to the lines $x$ and $y$ in the peripheral unit PE is a connecting logic AL which, in the embodiment of FIG. 1, contains a threshold AND element. As soon as a minimum voltage is simultaneously applied to both lines $x$ and $y$, which are connected to the inputs of the AND element, the latter provides an output signal which actuates a relay (not shown) which causes the peripheral unit to be connected to the data bus (not shown).

FIG. 2 shows the connecting logic AL in detail. It contains essentially two transistors Tx and Ty whose emitter-collector junctions are connected in parallel; in the quiescent condition, a voltage is applied to their bases via individual voltage dividers each consisting of two resistors $R_{x2}$, $R_{x3}$ and $R_{y2}$, $R_{y3}$ and a diode $G_{Bx}$, $G_{By}$, so the transistors Tx and Ty are conducting. At their collectors, which form the output terminal O, a positive voltage $+U_R$ thus appears in the quiescent condition. The bases of the transistors Tx and Ty are connected to the lines $x$ and $y$, respectively, via additional individual voltage dividers each consisting of two resistors $R_{x1}$, $R_{x2}$ and $R_{y1}$, $R_{y2}$ and a diode $G_{Sx}$, $G_{Sy}$, with the resistors $R_{x2}$ and $R_{y2}$ being common to two voltage dividers each. Thus, when the line voltage exceeds a threshold value predetermined by the voltage-divider ratio, the transistors connected to the associated voltage dividers, i.e. the transistors Tx and Ty, will be cut off.

If a voltage exceeding the threshold value is applied to only one of the lines $x$ and $y$, only one of the transistors Tx and Ty will be cut off. This does not change the state at the terminal O of the connecting logic AL because the other, still conducting transistor continues to provide the positive voltage $+U_L$ at its collector. Only when both transistors Tx and Ty are cut off (AND condition) does the state change from $+U_L$ to O, and the relay (not shown) is operated.

During addressing, the AND condition is satisfied for a single peripheral unit PE; this unit is connected to the data bus by the relay not shown, and the start contact AN is reopened in a manner not shown.

What is claimed is:

1. A circuit for detecting a change of condition at one of a plurality of units peripheral to a central control and for coupling said one unit to an output terminal, in which the units are arrayed in a coordinate matrix comprised of a first plurality of coordinate conductors coupled to respective coordinates of the matrix and a second plurality of coordinate conductors coupled to respective second coordinates of the matrix, means in one peripheral unit responsive to a change of condition therein for initiating marking potential to the coordinate conductors coupled to the one peripheral unit, said central control comprising a first sensing circuit common to conductors of said one coordinate, and a second sensing circuit common to conductors of said second coordinates, said sensing circuits individually responsive to marking potential to close a source of potential to the coordinate conductors of the one unit, a switching circuit in said one unit responsive to potential from said source over both of the coordinate conductors for switching said one unit through to an output terminal.

2. A detecting circuit as claimed in claim 1, in which at least one of said units includes means for generating another marking potential greater than said first mentioned marking potential, and sensing means for detecting the presence of said other marking potential in addition to the detection of marking potential by said first sensing means for signalling a priority condition.

3. A detecting circuit as claimed in claim 2, in which said means for generating said other marking potential includes a zener diode.

4. A detecting circuit as claimed in claim 1, in which there is further means responsive to the response of said sensing circuits to said marking potential for providing blocking potential to all coordinate conductors other than those closed to said source of potential.

5. A detecting circuit as claimed in claim 1, in which said switching circuit comprises a first switch responsive to potential from said source over one coordinate conductor and another switch responsive to potential from said source over a conductor of said other coordinate.

6. A detecting circuit as claimed in claim 5, in which said first and second switches comprise separate transistors both coupled to said output terminal, said transistor being normally conductive and being individually switched off responsive to potential from said source.

* * * * *